(12) United States Patent
Haataja

(10) Patent No.: US 6,916,523 B2
(45) Date of Patent: Jul. 12, 2005

(54) WOOD STRAND MOLDED PARTS HAVING THREE-DIMENSIONALLY CURVED OR BENT CHANNELS, AND METHOD FOR MAKING SAME

(75) Inventor: Bruce A. Haataja, Lake Linden, MI (US)

(73) Assignee: GFP Strandwood Corp., Hancock, MI (US)

( * ) Notice: Subject to any disclaimer, the term of this patent is extended or adjusted under 35 U.S.C. 154(b) by 0 days.

(21) Appl. No.: 10/432,870

(22) PCT Filed: Nov. 29, 2000

(86) PCT No.: PCT/US00/42389

§ 371 (c)(1),
(2), (4) Date: Dec. 4, 2003

(87) PCT Pub. No.: WO02/43950

PCT Pub. Date: Jun. 6, 2002

(65) Prior Publication Data

US 2004/0076801 A1 Apr. 22, 2004

(51) Int. Cl.[7] .............................. B32B 1/00; B31F 1/22
(52) U.S. Cl. ..................... 428/174; 428/124; 156/196; 156/204
(58) Field of Search .................................. 428/106, 113, 428/124, 126, 130, 174, 179, 182, 192; 156/196, 204, 205; 181/284, 286, 288, 290; 52/783.11

(56) References Cited

U.S. PATENT DOCUMENTS

| | | |
|---|---|---|
| 3,164,511 A | 1/1965 | Elmendorf |
| 3,238,281 A | 3/1966 | Kato |
| 3,354,248 A | 11/1967 | Haas et al. |
| 4,131,705 A | 12/1978 | Kubinsky |
| 4,213,928 A | 7/1980 | Casselbrant |
| 4,241,133 A | 12/1980 | Lund et al. |
| 4,246,310 A | 1/1981 | Hunt et al. |
| 4,248,163 A | 2/1981 | Caughey |
| 4,248,820 A | 2/1981 | Haataja |
| 4,337,710 A | 7/1982 | Haataja et al. |
| 4,384,019 A | 5/1983 | Haataja |
| 4,408,544 A | 10/1983 | Haataja |
| 4,440,708 A | 4/1984 | Haataja et al. |
| 4,469,216 A | 9/1984 | Haataja et al. |
| 4,790,966 A | 12/1988 | Sandberg et al. |
| 4,960,553 A | 10/1990 | DeBruine et al. |

*Primary Examiner*—Donald J. Loney
(74) *Attorney, Agent, or Firm*—Price, Heneveld, Cooper & DeWitt & Litton, LLP

(57) ABSTRACT

Wood strand molded parts (14) having three-dimensionally curved of bent channels (15) in a curved or bent part (15), curved or bent to form an inside angle of about 150° or less, and a method for making such parts.

30 Claims, 5 Drawing Sheets

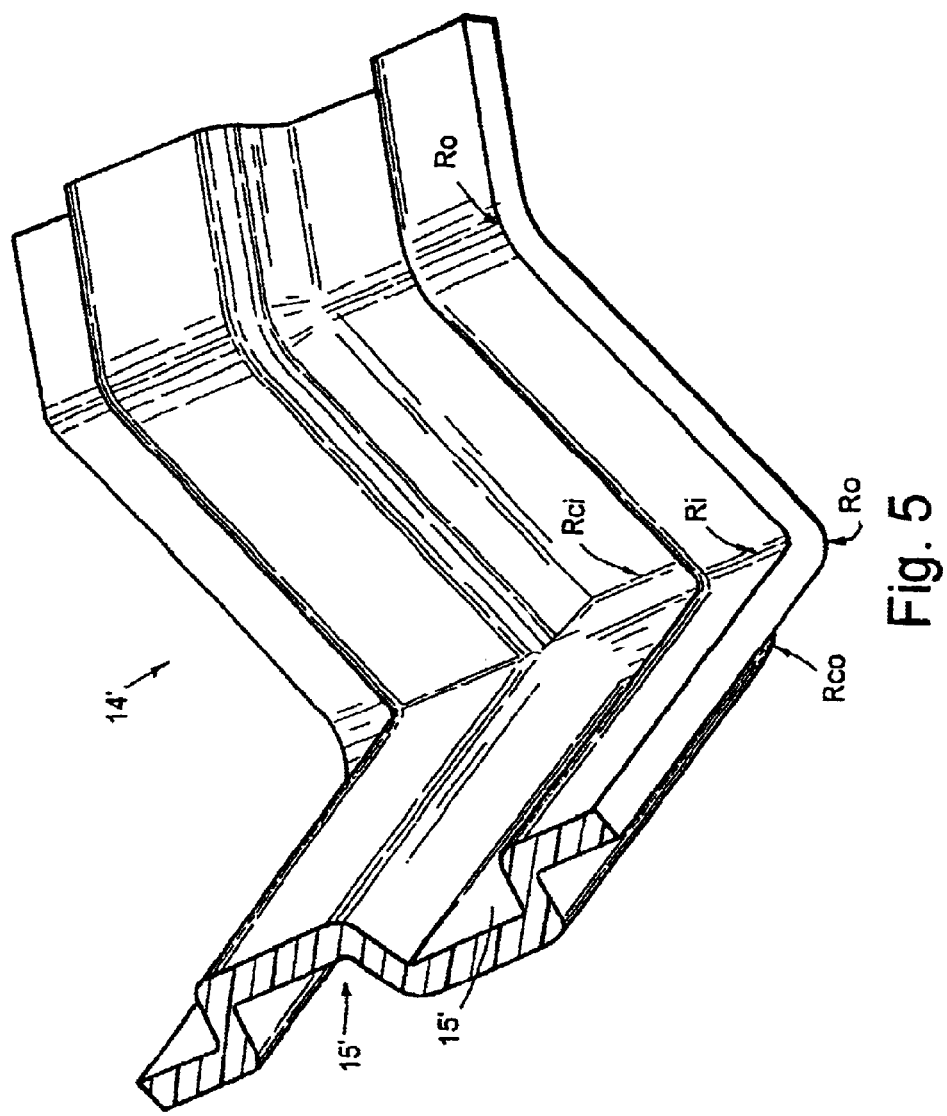

WOOD STRAND MOLDED PARTS HAVING THREE-DIMENSIONALLY CURVED OR BENT CHANNELS, AND METHOD FOR MAKING SAME

BACKGROUND OF THE INVENTION

A. Field of the Invention

The present invention relates to wood flake molding.

B. Background of the Art

Wood flake molding, also referred to as wood strand molding, is a technique invented by wood scientists at Michigan Technological University during the latter part of the 1970s for molding three-dimensionally configured objects out of binder coated wood flakes having an average length of about 1¼ to about 6 inches, preferably about 2 to about 3 inches; an average thickness of about 0.005 to about 0.075 inches, preferably about 0.015 to about 0.030 inches; and an average width of 3 inches or less, most typically 0.25 to 1.0 inches, and never greater than the average length of the flakes. These flakes are sometimes referred to in the art as "wood strands." This technology is not to be confused with oriented strand board technology (see e.g., U.S. Pat. No. 3,164,511 to Elmendorf) wherein binder coated flakes or strands of wood are pressed into planar objects. In wood flake or wood strand molding, the flakes are molded into three-dimensional, i.e., non-planar, configurations.

In wood flake molding, flakes of wood having the dimensions outlined above are coated with MDI or similar binder and deposited onto a metal tray having one open side, in a loosely felted mat, to a thickness eight or nine times the desired thickness of the final part. The loosely felted mat is then covered with another metal tray, and the covered metal tray is used to carry the mat to a mold. (The terms "mold" and "die", as well as "mold die", are sometimes used interchangeably herein, reflecting the fact that "dies" are usually associated with stamping, and "molds" are associated with plastic molding, and molding of wood strands does not fit into either category.) The top metal tray is removed, and the bottom metal tray is then slid out from underneath the mat, to leave the loosely felted mat in position on the bottom half of the mold. The top half of the mold is then used to press the mat into the bottom half of the mold at a pressure of approximately 600 psi, and at an elevated temperature, to "set" (polymerize) the MDI binder, and to compress and adhere the compressed wood flakes into a final three-dimensional molded part. The excess perimeter of the loosely felted mat, that is, the portion extending beyond the mold cavity perimeter, is pinched off where the part defining the perimeter of the upper mold engages the part defining perimeter of the lower mold cavity. This is sometimes referred to as the pinch trim edge.

U.S. Pat. Nos. 4,440,708 and 4,469,216 disclose this technology. The drawings in U.S. Pat. No. 4,469,216 best illustrate the manner in which the wood flakes are deposited to form a loosely felted mat, though the metal trays are not shown. By loosely felted, it is meant that the wood flakes are simply lying one on top of the other in overlapping and interleaving fashion, without being bound together in any way. The binder coating is quite dry to the touch, such that there is no stickiness or adherence which hold them together in the loosely felted mat. The drawings of U.S. Pat. No. 4,440,708 best illustrate the manner in which a loosely felted mat is compressed by the mold halves into a three-dimensionally configured article (see FIGS. 2–7, for example).

This is a different molding process as compared to a molding process one typically thinks of, in which some type of molten, semi-molten or other liquid material flows into and around mold parts. Wood flakes are not molten, are not contained in any type of molten or liquid carrier, and do not "flow" in any ordinary sense of the word. Hence, those of ordinary skill in the art do not equate wood flake or wood strand molding with conventional molding techniques.

In the past, relatively flat wood strand molded members have been formed with channels therein. See for example U.S. Pat. No. 4,408,544 to Bruce A. Haataja, entitled MOLDED WOOD PARTICLE PALLET HAVING INCREASED VENDING STRENGTH. The shaping of the part into the shape of a channel is to be distinguished from merely forming a channel shaped groove in one surface of a board, as is shown in U.S. Pat. No. 4,131,705 to Kubinsky.

Until the present invention, however, it was thought that one would not be able to mold three-dimensionally curved or bent channels into a three-dimensionally curved or bent surface of a wood strand molded part because of the difficulty of expecting the individual wood strands in the loosely felted mat to slide past one another such that they would move relatively uniformly into three-dimensionally curved or bent channels in a curved or bent part. It was believed that uneven distribution of the wood strands would leave the part weaker and with unsightly gaps.

SUMMARY OF THE INVENTION

In the present invention, it has been surprisingly discovered that one can mold a loosely felted mat of wood strand particles into a three-dimensionally curved or bent part having three-dimensionally curved or bent channels. Equally surprising is the fact that such molding does not weaken the part, but actually increases the strength of the part. Indeed, the formation of the three-dimensionally curved or bent channels in a three-dimensionally curved or bent part increases the strength of the part to a greater degree than would be expected by simply increasing the section modulus of the part through the use of channels. This surprising increase in strength has made it possible to form such parts with channels which are not as deep as one would have expected necessary in order to increase the strength of the part.

These and other features, advantages and objects of the present invention will be further understood and appreciated by those skilled in the art by reference to the following specification and claims.

BRIEF DESCRIPTION OF THE DRAWINGS

FIG. 5 is a perspective view of a part which includes a sharply bent portion.

DETAILED DESCRIPTION OF THE PREFERRED EMBODIMENTS

For purposes of description herein, the terms "upper," "lower," "right," "left," "rear," "front," "vertical,"

Figure 1:
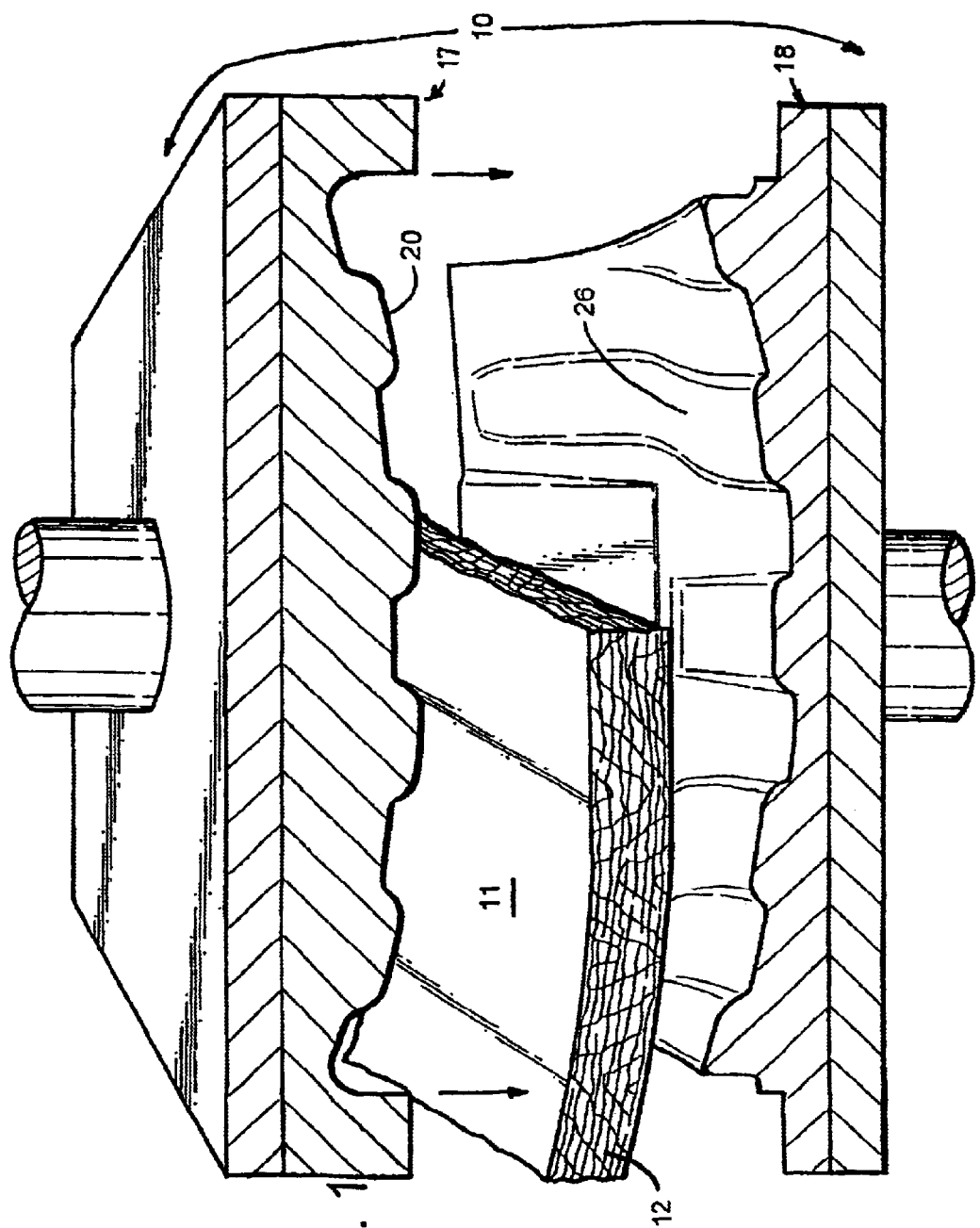
FIG. 1 is a cross-sectioned, fragmentary perspective view of a loosely felted mat, with a portion broken away, in position on a lower mold half which is three-dimensionally curved to form a three-dimensionally curved part with three-dimensionally curved channels, and showing the upper die in position to close on the lower mold die.

"horizontal," and derivatives thereof shall relate to the invention as orientated in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
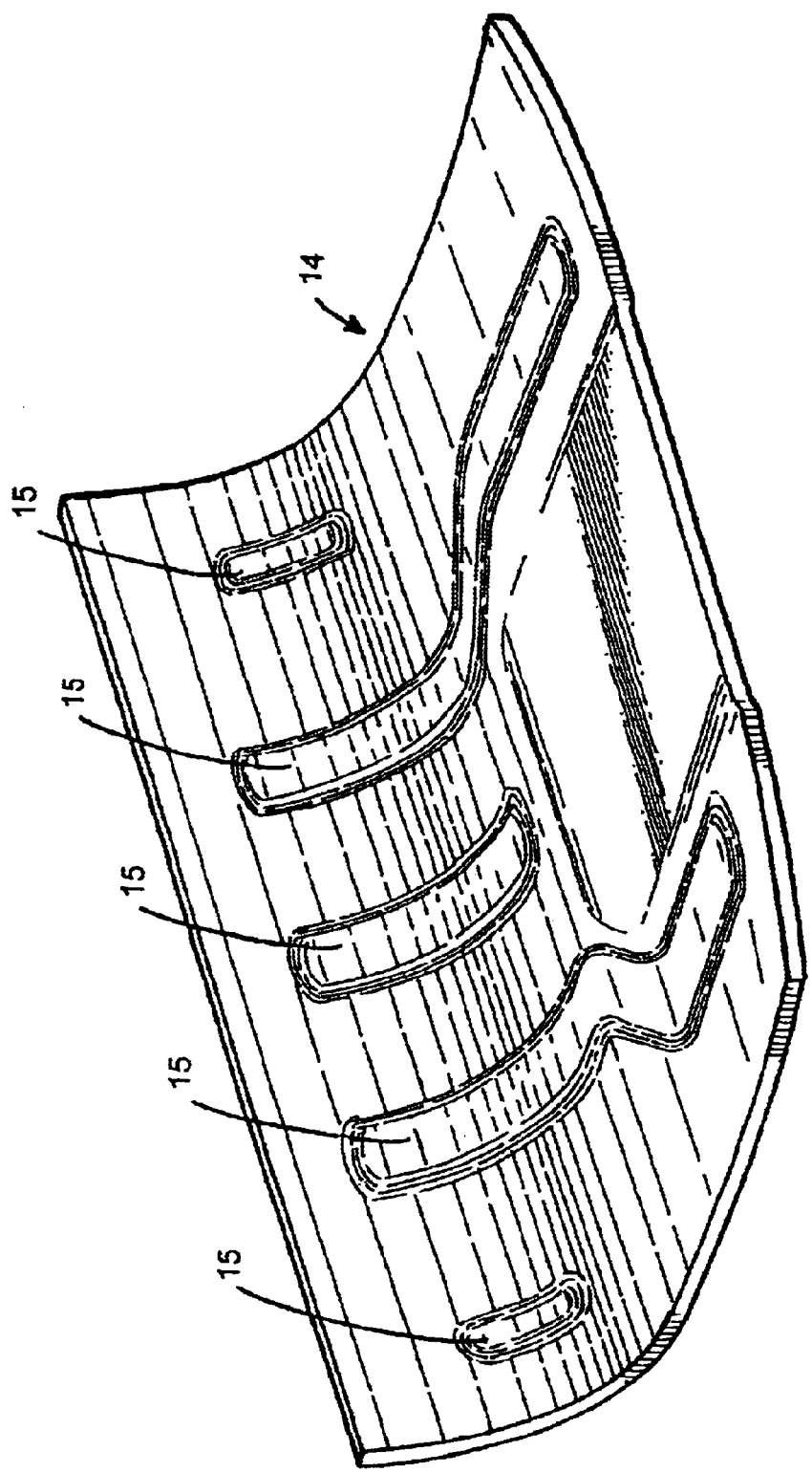
FIG. 3 is a perspective view of the part made with a mold of FIGS. 1 and 2.

The reference number 10 (FIG. 1) generally designates a mold of the present invention. The mold 10 is used in a method of forming a loosely felted mat 11 of wood flakes 12 into a molded wood flake part 14 (FIG. 3). The mold 10 includes a top mold die 17 and a bottom mold die 18. The top mold die 17 includes a surface 20, and the bottom mold die 18 includes a surface 26. The surface 20 of the top mold die 17 and the surface 26 of the bottom mold die 18 define a cavity 30 therebetween.

Figure 2:
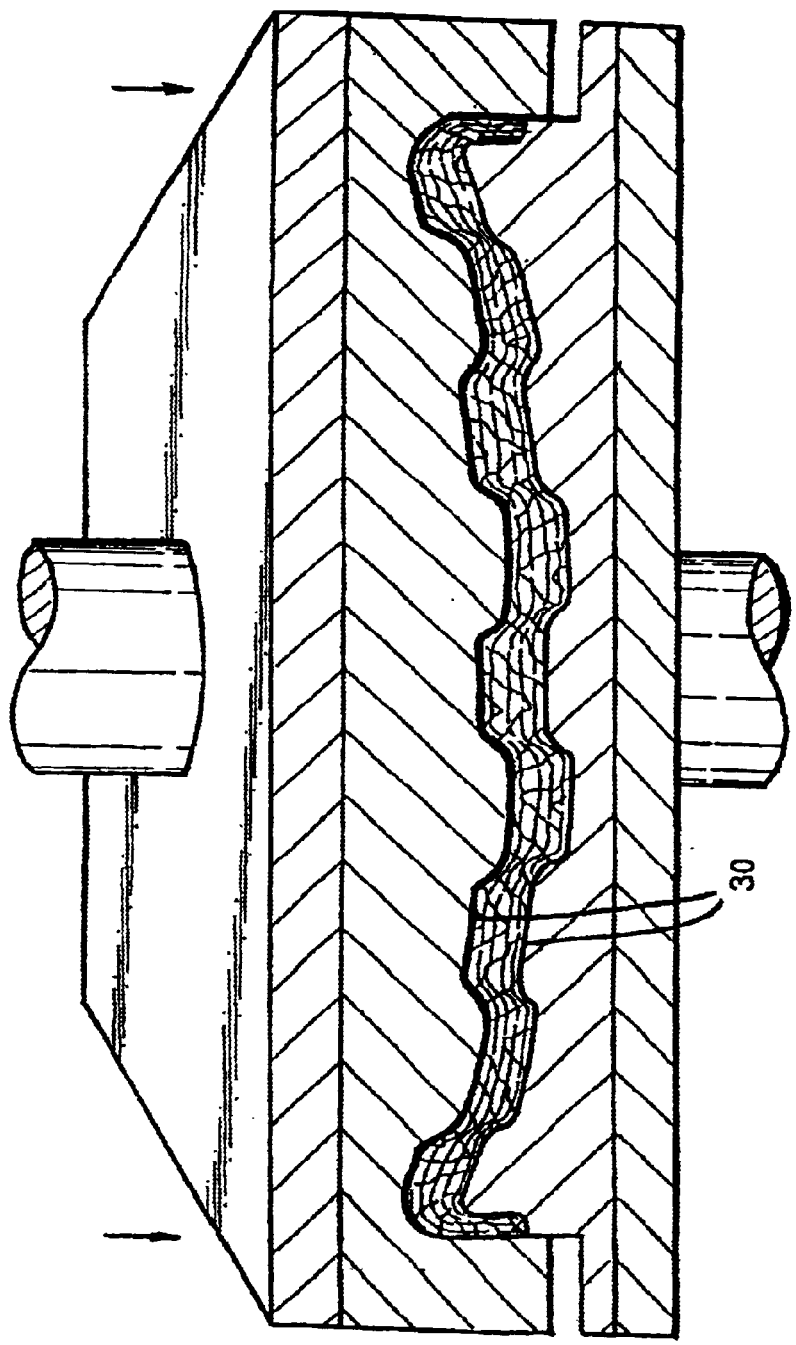
FIG. 2 is a similar view showing the mold halves closing.

In the illustrated example, the molded wood flake part 14 is made by positioning a loosely felted mat 11 of wood flakes 12 on the bottom mold die 18 (FIG. 1). The top mold die 16 and the bottom mold die 18 are then brought together (FIG. 2) and heat and pressure are applied to the felted mat 11. The felted mat 11 is thereby compressed and cured into the molded wood flake part 14.

Figure 4:
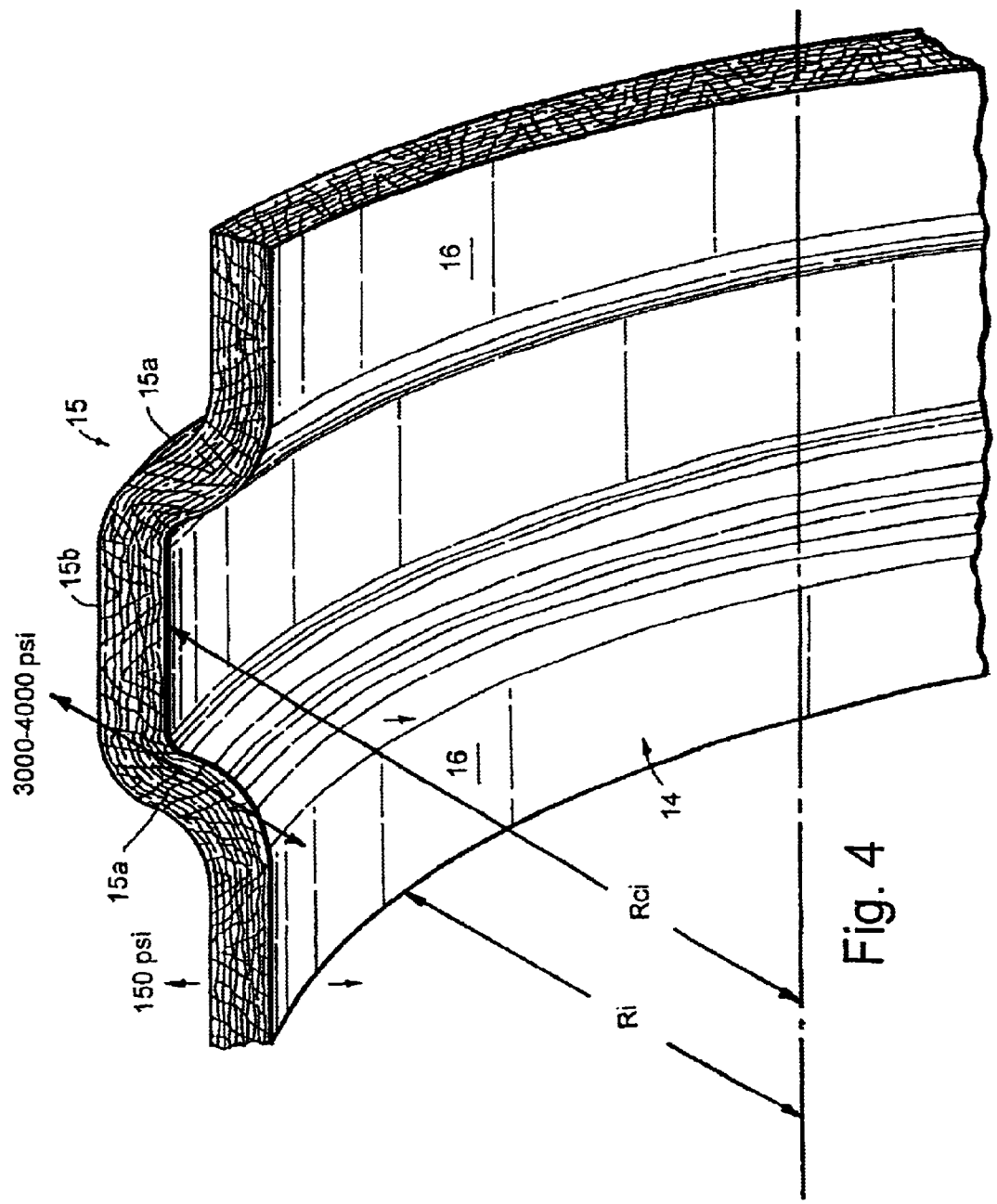
FIG. 4 is a fragmentary cross-sectional view showing the orientation of the wood strands in the various portions of the molded part, and highlighting the tensile strength of various areas of the part.

The part 14 or 14' formed in accordance with the preferred embodiment includes three-dimensionally curved or bent channels 15 or 15' (FIG. 3 or FIG. 5), each comprising spaced sidewalls 15a and a channel base wall 15b (FIG. 4). Channels 15 can be "V" shaped in cross section as well. When they are "U" shaped, the sidewalls must have at least some draft, i.e. make at least a slight angle to the vertical, in order to facilitate release from the mold die. Channels 15 are said to be three-dimensionally curved or bent in that the wall 16 of molded part 14, into which channels 15 are shaped, is curved or bent, rather than being flat, such that the part includes portions on opposite sides of the curved or bent portion forming an inside angle of about 150° or less, preferably about 135° or less, and most preferably about 120° to about 80°. The radius of curvature on the inside (Ri) of the curved or bent portion can be essentially zero for a sharply bent part, or can be much greater in the case of a more gradually curved or bent part. The radius on the outside (Ro) of the part at the curved or sharply bent portion will preferably be equal to at least the thickness of the part in order to facilitate formation of the part. Preferably, the radius of curvature of the inside of the channel (Rci) is at least equal to the depth of draw of the channel. Preferably, the outside radius of the channel (Rco) is at least about equal to the thickness of the part plus the depth of draw of the part, to facilitate part formation.

Molding wood strand parts is not a question of flowing a plastic material into a curved or bent section of a mold. Somehow, the individual strands in the loosely felted mat have to slide past one another such that they will move relatively uniformly into the three-dimensionally curved or bent channels in the curved or bent part. One would have expected to see part weakening and unsightly gaps form in the three-dimensionally curved or bent channels. Such gaps do not occur, however.

It was surprising to find that the parts increased in strength beyond that which would be expected merely by forming channels in the part. This appears to be due to the orientation of the wood strands or flakes in the channel sidewalls 15a. In curved or bent portions, the strands or flakes tend to lie in generally parallel planes, which are also parallel to the top and bottom surfaces of part 14. When one applies a force to open the bend of part 14, as would be the case if part 14 were used as a chair shell, for example, one places the cross section of part 14 in tension perpendicular to the surface. Because of the orientation of the wood strands or flakes, the tensile strengths perpendicular to the surface of part 14 in wall 16 tends to be determined by the strength of the binder used, and is approximately 150 psi.

In contrast, the formation of channels 15 tends to cause the wood flakes or strands in sidewalls 15a to orient in a direction generally parallel to the inside and outside surfaces of walls 15a, but in a direction which is generally parallel to the tensile force which is placed on part 16 by a bending moment. The tensile strength of the strands placed in tension in the direction of orientation of the strands is from 3,000–4,000 psi., as compared to about 150 psi. when the tensile force is applied perpendicularly to the planes of the strands. As a result, the strength of part 14 to resist a bending moment is substantially greater for any given channel depth than would otherwise have been expected.

One normally adds channels to a part in order to increase their section modulus and thus their resistance to bending moment. However we have found that one can design part 16 with a channel depth of only ½ inch to accomplish significant strength improvement.

The number of channels and the depth of draw of the channels are the major factors which influence back pull strength. The greater the number of channels, the greater the area of side wall acting in resistance to the radial tensile stress. Also, the greater the channel draw depth, the greater the section modulus. Molding difficulty increases with both increased number of channels and increased depth. Both require greater mat elongation for uniform material density.

A configuration of multiple channels and draw depth which required 10% mat elongation in a direction laterally of the length of said channels, provided chair shells with approximately 25% back pull strength improvement. Significant strength improvement could be expected with a combination requiring as little as 5% mat elongation with strategically located channels. Configurations requiring 30% mat elongation can be made with extra mat preparation efforts (i.e. extra material added to the mat in areas where channels are to be formed).

The wood flakes 12 used in creating the molded wood flake part 14 can be prepared from various species of suitable hardwoods and softwoods used in the manufacture of particleboard. Representative examples of suitable woods include aspen, maple, oak, elm, balsam fir, pine, cedar, spruce, locust, beech, birch and mixtures thereof. Aspen is preferred.

Suitable wood flakes 12 can be prepared by various conventional techniques. Pulpwood grade logs, or so-called round wood, are converted into wood flakes 12 in one operation with a conventional roundwood flaker. Logging residue or the total tree is first cut into fingerlings in the order of 2–6 inches long with a conventional device, such as the helical comminuting shear disclosed in U.S. Pat. No. 4,053,004, and the fingerlings are flaked in a conventional ring-type flaker. Roundwood wood flakes 12 generally are higher quality and produce stronger parts because the lengths and thickness can be more accurately controlled. Also, roundwood wood flakes 12 tend to be somewhat flatter, which facilitates more efficient blending and the logs can be debarked prior to flaking which reduces the amount of less desirable fines produced during flaking and handling. Acceptable wood flakes 12 can be prepared by ring flaking fingerlings and this technique is more readily adaptable to accept wood in poorer form, thereby permitting more complete utilization of certain types of residue and surplus woods.

Irrespective of the particular technique employed for preparing the wood flakes 12, the size distribution of the wood flakes 12 is quite important, particularly the length and thickness. The wood flakes should have an average length of about 1¼ inch to about 6 inches and an average thickness of about 0.005 to about 0.075 inches. The average length of the wood flakes is preferably about 2 to about 3 inches. In any given batch, some of the wood flakes 12 can be shorter than 1¼ inch, and some can be longer than 6 inches, so long as the overall average length is within the above range. The same is true for the thickness.

The presence of major quantities of wood flakes 12 having a length shorter than about 1¼ inch tends to cause the felted mat 11 to pull apart during the molding step. The presence of some fines in the felted mat 11 produces a smoother surface and, thus, may be desirable for some applications so long as the majority of the wood flakes, preferably at least 75%, is longer than 1⅛ inch and the overall average length is at least 1¼ inch.

Substantial quantities of wood flakes 12 having a thickness of less than about 0.005 inches should be avoided, because excessive amounts of binder are required to obtain adequate bonding. On the other hand, wood flakes 12 having a thickness greater than about 0.075 inch are relatively stiff and tend to overlie each other at some incline when formed into the felted mat 11. Consequently, excessively high mold pressures are required to compress the wood flakes 12 into the desired intimate contact with each other. For wood flakes 12 having a thickness falling within the above range, thinner ones produce a smoother surface while thicker ones require less binder. These two factors are balanced against each other for selecting the best average thickness for any particular application. The average thickness of the wood flakes 12 preferably is about 0.015 to about 0.25 inches, and more preferably about 0.0020 inch.

The width of the wood flakes 12 is less important. The wood flakes 12 should be wide enough to ensure that they lie substantially flat when felted during mat formation. The average width generally should be about 3 inches or less and no greater than the average length. For best results, the majority of the wood flakes 12 should have a width of about ¹⁄₁₆ inch to about 3 inches, and preferably 0.25 to 1.0 inches.

The blade setting on a flaker can primarily control the thickness of the wood flakes 12. The length and width of the wood flakes 12 are also controlled to a large degree by the flaking operation. For example, when the wood flakes 12 are being prepared by ring flaking fingerlings, the length of the fingerlings generally sets the maximum lengths. Other factors, such as the moisture content of the wood and the amount of bark on the wood affect the amount of fines produced during flaking. Dry wood is more brittle and tends to produce more fines. Bark has a tendency to more readily break down into fines during flaking and subsequent handling than wood.

While the flake size can be controlled to a large degree during the flaking operation as described above, it usually is necessary to use some sort of classification in order to remove undesired particles, both undersized and oversized, and thereby ensure the average length, thickness and width of the wood flakes 12 are within the desired ranges. When roundwood flaking is used, both screen and air classification usually are required to adequately remove both the undersize and oversize particles, whereas fingerling wood flakes 12 usually can be properly sized with only screen classification.

Wood flakes 12 from some green wood can contain up to 90% moisture. The moisture content of the mat must be substantially less for molding as discussed below. Also, wet wood flakes 12 tend to stick together and complicate classification and handling prior to blending. Accordingly, the wood flakes 12 are preferably dried prior to classification in a conventional type drier, such as a tunnel drier, to the moisture content desired for the blending step. The moisture content to which the wood flakes 12 are dried usually is in the order of about 6 weight % or less, preferably about 2 to about 5 weight %, based on the dry weight of the wood flakes 12. If desired, the wood flakes 12 can be dried to a moisture content in the order of 10 to 25 weight % prior to classification and then dried to the desired moisture content for blending after classification. This two-step drying may reduce the overall energy requirements for drying wood flakes 12 prepared from green woods in a manner producing substantial quantities of particles which must be removed during classification and, thus, need not be as thoroughly dried.

To coat the wood flakes 12 prior to being placed as a felted mat 11 within the cavity 30 within the mold 10, a known amount of the dried, classified wood flakes 12 is introduced into a conventional blender, such as a paddle-type batch blender, wherein predetermined amounts of a resinous particle binder, and optionally a wax and other additives, is applied to the wood flakes 12 as they are tumbled or agitated in the blender. Suitable binders include those used in the manufacture of particle board and similar pressed fibrous products and, thus, are referred to herein as "resinous particle board binders." Representative examples of suitable binders include thermosetting resins such as phenolformaldehyde, resorcinol-formaldehyde, melamine-formaldehyde, urea-formaldehyde, urea-furfuryl and condensed furfuryl alcohol resins, and organic polyisocyantes, either alone or combined with urea- or melamine-formaldehyde resins.

Particularly suitable polyisocyanates are those containing at least two active isocyanate groups per molecule, including diphenylmethane diisocyanates, m- and p-phenylene diisocyanates, chlorophenylene diisocyanates, toluene di- and triisocyanates, triphenylmethene triisocyanates, diphenylether-2,4,4'-triisoccyanate and polyphenylpolyisocyanates, particularly diphenylmethane-4,4'-diisocyanate. So-called MDI is particularly preferred.

The amount of binder added to the wood flakes 12 during the blending step depends primarily upon the specific binder used, size, moisture content and type of the wood flakes 12, and the desired characteristics of the part being formed. Generally, the amount of binder added to the wood flakes 12 is about 2 to about 15 weight %, preferably about 4 to about 10 weight %, as solids based on the dry weight of the wood flakes 12. When a polyisocyanate is used alone or in combination with a urea-formaldehyde resin, the amounts can be more toward the lower ends of these ranges.

The binder can be admixed with the wood flakes 12 in either dry or liquid form. To maximize coverage of the wood flakes 12, the binder preferably is applied by spraying droplets of the binder in liquid form onto the wood flakes 12 as they are being tumbled or agitated in the blender. When polyisocyantes are used, a conventional mold release agent preferably is applied to the die or to the surface of the felted mat prior to pressing. To improve water resistance of the part, a conventional liquid wax emulsion preferably is also sprayed on the wood flakes 12 during the blinding step. The amount of wax added generally is about 0.5 to about 2 weight %, as solids based on the dry weight of the wood flakes 12. Other additives, such as at least one of the following: a coloring agent, fire retardant, insecticide, fungicide, mixtures thereof and the like may also be added to the wood flakes 12 during the blending step. The binder, wax and other additives can be added separately in any sequence or in combined form.

The moistened mixture of binder, wax and wood flakes 12 or "furnish" from the blending step is formed into a loosely-felted, layered mat 11, which is placed within the cavity 30 prior to the molding and curing of the felted mat 11 into molded wood flake part 14. The moisture content of the wood flakes 12 should be controlled within certain limits so as to obtain adequate coating by the binder during the blending step and to enhance binder curing and deformation of the wood flakes 12 during molding.

The presence of moisture in the wood flakes 12 facilitates their bending to make intimate contact with each other and enhances uniform heat transfer throughout the mat during the molding step, thereby ensuring uniform curing. However, excessive amounts of water tend to degrade some binders, particularly urea-formaldehyde resins, and generate steam which can cause blisters. On the other hand, if the wood flakes 12 are too dry, they tend to absorb excessive amounts of the binder, leaving an insufficient amount on the surface to obtain good bonding and the surfaces tend to cause hardening which inhibits the desired chemical reaction between the binder and cellulose in the wood. This latter condition is particularly true for polyisocyanate binders.

Generally, the moisture content of the furnish after completion of blending, including the original moisture content of the wood flakes 12 and the moisture added during blending with the binder, wax and other additives, should be about 5 to about 25 weight %, preferably about 8 to about 12 weight %. Generally, higher moisture contents within these ranges can be used for polyisocyanate binders because they do not produce condensation products upon reacting with cellulose in the wood.

The furnish is formed into the generally flat, loosely-felted, mat 11, preferably as multiple layers. A conventional dispensing system, similar to those disclosed in U.S. Pat. Nos. 3,391,223, 3,824,058, and 4,469,216 can be used to form the felted mat 11. Generally, such a dispensing system includes trays, each having one open side, carried on an endless belt or conveyor and one or more (e.g., three) hoppers spaced above and along the belt in the direction of travel for receiving the furnish.

When a multi-layered felted mat 11 is formed, a plurality of hoppers usually are used with each having a dispensing or forming head extending across the width of the carriage for successively depositing a separate layer of the furnish as the tray is moved beneath the forming heads. Following this, the tray is taken to the mold to place the felted mat within the cavity of bottom mold, by sliding the tray out from under the mat.

In order to produce molded wood flake parts 14 having the desired edge density characteristics without excessive blistering and springback, the felted mat should preferably have a substantially uniform thickness and the wood flakes 12 should lie substantially flat in a horizontal plane parallel to the surface of the carriage and be randomly oriented relative to each other in that plane. The uniformity of the mat thickness can be controlled by depositing two or more layers of the furnish on the carriage and metering the flow of furnish from the forming heads.

Spacing the forming heads above the carriage so the wood flakes 12 must drop about 1 to about 3 feet from the heads en route to the carriage can enhance the desired random orientation of the wood flakes 12. As the flat wood flakes 12 fall from that height, they tend to spiral downwardly and land generally flat in a random pattern. Wider wood flakes 12 within the range discussed above enhance this action. A scalper or similar device spaced above the carriage can be used to ensure uniform thickness or depth of the mat, however, such means usually tend to align the top layer of wood flakes 12, i.e., eliminate the desired random orientation. Accordingly, the thickness of the mat that would optimally have the nominal part thickness 100 is preferably controlled by closely metering the flow of furnish from the forming heads. The mat thickness that would optimally have the nominal part thickness 100 used will vary depending upon such factors as the size and shape of the wood flakes 12, the particular technique used for forming the mat 11, the desired thickness and density of the molded wood flake part 14 produced, the configuration of the molded wood flake part 14, and the molding pressure to be used.

Following the production of the felted mat 11 and placement of the felted mat 11 within the cavity 30 of the mold 10, the felted mat 11 mat is compressed and cured under heat and pressure when the top mold die 16 engages the bottom mold die 18.

The felted mat 11 is then compressed and cured between the top mold die 16 and the bottom mold 18 to become the molded wood flake part 14. After the molded wood flake part 14 is produced by the method of the present invention, any flashing is removed by conventional means.

The resulting part 14, 14' comprises a wall 16 having three-dimensionally curved or bent channels 15, 15' molded therein. Such a part is useful as a chair shell, for example, having a seat portion which curves gradually into a back portion. The three-dimensionally curved or bent channels afford surprising strength to such a part, due to the orientation of the wood strands or wood flakes in a direction generally parallel to the channel sidewalls 15a, and therefore generally parallel to the tensile force placed on part 14 when it is subjected to a bending moment, as for example when someone sits in a chair shell and leans back against the back of the shell.

The above description is that of the preferred embodiment only. Modifications of the invention will occur to those skilled in the art and to those who make or use the invention. Therefore, it is understood that the embodiment described above is merely for illustrative purposes and not intended to limit the scope of the invention, which is defined by the following claims as interpreted according to the principles of patent law, including the Doctrine of Equivalents.

The invention claimed is:

1. A wood strand molded part, molded from a loosely felted mat of wood flakes having an average length of about 1¼ to about 6 inches, an average thickness of about 0.005 to about 0.075 inches, and an average width of 3 inches or less, said average width never being greater than said avenge length of said flakes, wherein said part has at least a curved or bent portion having at least one three-dimensionally curved or bent channel formed in said curved or bent portion, said part having portions on opposite sides of said curved or bent portions which form an inside angle of about 150° or less.

2. The wood strand molded part of claim 1 wherein said wood flakes have an average length of about 2 to about 3 inches, an average thickness of about 0.015 to about 0.030 inches, and an average width of about 0.025 to 1.0 inches.

3. The wood strand molded part of claim 2 in which said inside angle is about 135° or less.

4. The wood strand molded part of claim 3 in which said inside angle is about 120° to about 80°.

5. The wood strand molded part of claim 1 in which the number of said channels formed in said part, combined with the depth of said channels, is sufficient to require a 5% elongation of said loosely felted mat, in a direction generally lateral with respect to the length of said channels, during the formation of said mat into said part.

6. The wood strand molded part of claim 1 in which the number of said channels formed in said part, combined with the depth of said channels, is sufficient to require a 10% elongation of said loosely felted mat, in a direction generally lateral with respect to the length of said channels, during the formation of said mat into said part.

7. The wood strand molded part of claim 1 in which the number of said channels formed in said part, combined with the depth of said channels, is sufficient to require a 30% elongation of said loosely felted mat, in a direction generally lateral with respect to the length of said channels, during the formation of said mat into said part.

8. The wood strand molded part of claim 1 in which said inside angle is about 135° or less.

9. The wood strand molded part of claim 8 in which the number of said channels formed in said part, combined with the depth of said channels, is sufficient to require a 5% elongation of said loosely felted mat, in a direction generally lateral with respect to the length of said channels, during the formation of said mat into said part.

10. The wood strand molded part of claim 8 in which the number of said channels formed in said part, combined with the depth of said channels, is sufficient to require a 10% elongation of said loosely felted mat, in a direction generally lateral with respect to the length of said channels, during the formation of said mat into said part.

11. The wood strand molded part of claim 8 in which the number of said channels formed in said part, combined with the depth of said channels, is sufficient to require a 30% elongation of said loosely felted mat, in a direction generally lateral with respect to the length of said channels, during the formation of said mat into said part.

12. The wood strand molded part of claim 1 in which said inside angle is about 120° to about 80°.

13. The wood strand molded part of claim 12 in which the number of said channels formed in said part, combined with the depth of said channels, is sufficient to require a 5% elongation of said loosely felted mat, in a direction generally lateral with respect to the length of said channels, during the formation of said mat into said part.

14. The wood strand molded part of claim 12 in which the number of said channels formed in said part, combined with the depth of said channels, is sufficient to require a 10% elongation of said loosely felted mat, in a direction generally lateral with respect to the length of said channels, during the formation of said mat into said part.

15. The wood strand molded part of claim 12 in which the number of said channels formed in said part, combined with the depth of said channels, is sufficient to require a 30% elongation of said loosely felted mat, in a direction generally lateral with respect to the length of said channels, during the formation of said mat into said part.

16. A method of forming a wood strand molded part, by molding a loosely felted mat of wood flakes having an average length of about 1¼ to about 6 inches, an average thickness of about 0.005 to about 0.075 inches, and an average width of 3 inches or less, said average width never being greater than said average length of maid flakes, by placing said loosely felted mat in a mold configured to form a curved or bent part having at least one three-dimensionally curved or bent channel formed in said curved or bent portion, said part having portions on opposite sides of said curved or bent portions which form an inside angle of about 150 or less.

17. The method of claim 16 in which said wood flakes in said mat have an average length of about 2 to about 3 inches, an average thickness of about 0.015 to about 0.030 inches, and an average width of about 0.025 to 1.0 inches.

18. The method of claim 17 wherein said inside angle is about 135 or less.

19. The method of claim 18 wherein said inside angle is from about 120° to about 80°.

20. The method of claim 16 wherein said mold is configured to form a sufficient number of said channels of a sufficient depth to cause about a 5% elongation of said mat in a direction generally lateral of the length of said channels.

21. The method of claim 16 wherein said mold is configured to form a sufficient number of said channels of a sufficient depth to cause about a 10% elongation of said mat in a direction generally lateral of the length of said channels.

22. The method of claim 16 wherein said mold is configured to form a sufficient number of said channels of a sufficient depth to cause about a 30% elongation of said mat in a direction generally lateral of the length of said channels.

23. The method of claim 16 wherein said inside angle is about 135° or less.

24. The method of claim 23 wherein said mold is configured to form a sufficient number of said channels of a sufficient depth to cause about a 5% elongation of said mat in a direction generally lateral of the length of said channels.

25. The method of claim 23 wherein said mold is configured to form a sufficient number of said channels of a sufficient depth to cause about a 10% elongation of said mat in a direction generally lateral of the length of said channels.

26. The method of claim 23 wherein said mold is configured to form a sufficient number of said channels of a sufficient depth to cause about a 30% elongation of said mat in a direction generally lateral of the length of said channels.

27. The method of claim 16 wherein said inside angle is from about 120° to about 80°.

28. The method of claim 27 wherein said mold is configured to form a sufficient number of said channels of a sufficient depth to cause about a 5% elongation of said mat in a direction generally lateral of the length of said channels.

29. The method of claim 27 wherein said mold is configured to form a sufficient number of said channels of a sufficient depth to cause about a 10% elongation of said mat in a direction generally lateral of the length of said channels.

30. The method of claim 27 wherein said mold is configured to form a sufficient number of said channels of a sufficient depth to cause about a 30% elongation of said mat in a direction generally lateral of the length of said channels.

* * * * *

UNITED STATES PATENT AND TRADEMARK OFFICE
CERTIFICATE OF CORRECTION

PATENT NO. : 6,916,523 B2
DATED : July 12, 2005
INVENTOR(S) : Bruce A. Haataja

It is certified that error appears in the above-identified patent and that said Letters Patent is hereby corrected as shown below:

Column 10,
Line 8, "maid" should be -- said --.
Line 13, "portions" should be -- portion --.
Line 20, after "135" insert -- ° (degree sign) --.

Signed and Sealed this

Thirteenth Day of December, 2005

JON W. DUDAS
*Director of the United States Patent and Trademark Office*